(12) United States Patent
Ito et al.

(10) Patent No.: US 8,498,060 B2
(45) Date of Patent: Jul. 30, 2013

(54) LENS BARREL

(75) Inventors: Daisuke Ito, Kanagawa (JP); Hironori Honsho, Hyogo (JP); Yoshiharu Araki, Osaka (JP)

(73) Assignee: Panasonic Corporation, Osaka (JP)

( * ) Notice: Subject to any disclaimer, the term of this patent is extended or adjusted under 35 U.S.C. 154(b) by 32 days.

(21) Appl. No.: 13/233,026

(22) Filed: Sep. 15, 2011

(65) Prior Publication Data

US 2012/0069459 A1    Mar. 22, 2012

(30) Foreign Application Priority Data

Sep. 17, 2010  (JP) ................................. 2010-208914
Aug. 18, 2011  (JP) ................................. 2011-178863

(51) Int. Cl.
*G02B 7/04*    (2006.01)
*G02B 7/08*    (2006.01)

(52) U.S. Cl.
USPC ............................. 359/694; 359/823; 359/824

(58) Field of Classification Search
USPC .......................... 359/687, 694–704, 823, 824
See application file for complete search history.

(56) References Cited

U.S. PATENT DOCUMENTS

| 7,088,524 B2 * | 8/2006 | Nomura et al. ............... 359/700 |
| 7,544,004 B2 | 6/2009 | Kawai et al. |
| 2008/0117527 A1 * | 5/2008 | Nuno et al. ................... 359/687 |
| 2008/0148892 A1 * | 6/2008 | Sato .............................. 74/422 |

FOREIGN PATENT DOCUMENTS

| JP | 2001-215394 A | 8/2001 |
| JP | 2003-057517 A | 2/2003 |
| JP | 2004-053854 A | 2/2004 |
| JP | 2005-055761 A | 3/2005 |
| JP | 2006-227170 A | 8/2006 |
| JP | 2006-243147 A | 9/2006 |

* cited by examiner

*Primary Examiner* — Scott J Sugarman
*Assistant Examiner* — Daniele Manikeu
(74) *Attorney, Agent, or Firm* — Shinjyu Global IP (57) ABSTRACT

A lens barrel is provided that includes an image optical system with an optical axis. The lens barrel has a first lens, a second lens, a guide shaft, and a driving unit, an adjusting mechanism, and a base frame. The adjusting mechanism is coupled to the guide shaft and has a first and a second portion. The first portion is deflectable and supports one end of the guide shaft. The second portion is configured to press against the first portion to deflect the first portion at an angle relative to the optical axis. The adjusting mechanism is configured to adjust the position of the guide shaft. The guide shaft is arranged to at least partially overlap the driving unit in the circumferential direction around the optical axis, and the first lens is arranged to at least partially overlap the adjusting mechanism in the radial direction relative to the optical axis.

9 Claims, 9 Drawing Sheets

LENS BARREL

CROSS-REFERENCE TO RELATED APPLICATIONS

This application claims priority to Japanese Patent Application No. 2010-208914, filed on Sep. 17, 2010 and Japanese Patent Application No. 2011-178863, filed on Aug. 18, 2011. The entire disclosure of Japanese Patent Application No. 2010-208914 and Japanese Patent Application No. 2011-178863 are hereby incorporated herein by reference.

BACKGROUND

1. Technical Field

The technology disclosed herein relates to an optical-axis adjustable lens barrel.

2. Background Information

The interchangeable lens digital cameras have been rapidly widespread in recent years. For example, some of such cameras are configured to convert an optical image of an object into an electric image signal and output the obtained electric image signal. Downsizing of the interchangeable lens barrels has been demanded for such digital cameras with the trend of downsizing of the camera bodies.

The lens barrel is embedded with a zoom lens configured to perform a zoom action. The zoom lens is movable along the optical axis within the lens barrel. The zoom lens is held by a lens holding frame. The zoom lens includes a guide shaft for guiding the lens holding frame in an optical axis direction. The guide shaft is supported by the lens barrel. Light from an object passes through a lens system including the zoom lens, and an optical image of the object is imaged in an image sensor.

In such lens systems, the optical axis of the zoom lens may be tilted with respect to the optical axis of a fixed lens fixed to the lens barrel due to a variety of factors such as size errors of the lens holding frame and the lens barrel or variation in accuracy of attaching the lens to the lens holding frame. The tilted optical axis may cause focus blur (e.g., partial blur) in the optical image of the object to be imaged on the imaging surface of the image sensor.

In view of the above, Japan Laid-open Patent Application Publication No. JP-A-2006-227170 describes a construction of a lens barrel configured to adjust the tilt of the optical axis of the zoom lens. Specifically, the publication discloses a bearing member. The bearing member includes a shaft portion and a bearing hole. The shaft portion of the bearing member is detachably inserted into a hole of the lens barrel from the outside. The bearing hole has a center axis displaced from that of the shaft portion. In the publication, multiple bearing members are prepared and the inter-axes displacements thereof are different from each other. In assembling the lens barrel, the optimal one of the bearing members is selected and attached to the lens barrel in accordance with the tilt of the optical axis, and the optical axis is thereby adjusted.

In downsizing a lens barrel including an adjusting mechanism, it is required not only to simply downsize an image optical system but also to efficiently dispose the adjusting mechanism and the other components in a limited space without spatial interference among the components. It is also required to form the adjusting mechanism and the other components in optimal shapes for disposing them in a limited space.

SUMMARY

One object of the technology disclosed herein is to provide a lens barrel that avoids spatial interference among components, thereby achieving reduction in thickness and diameter, and making it easy to adjust the optical axis.

In accordance with one aspect of the technology disclosed herein, a lens barrel is provided that includes an image optical system with an optical axis.

The lens barrel has a first lens, a second lens, a guide shaft, and a driving unit, an adjusting mechanism, and a base frame. The first lens is configured to collect light from an object, and the second lens is disposed in the axial direction of the first lens and is configured to move along the optical axis. The guide shaft is disposed in the radial direction relative to the optical axis and is configured to guide the second lens along the optical axis. The driving unit is configured to move the second lens along the guide shaft. The adjusting mechanism is disposed in the radial direction relative to the optical axis and is coupled to the guide shaft. The adjusting mechanism has a first portion and a second portion. The first portion is elastically deflectable and holds one end of the guide shaft. The second portion is configured to press against the first portion to cause the first portion to deflect at an angle relative to the optical axis. The adjusting mechanism is configured to adjust the position of the guide shaft if the second portion presses against the first portion. The base frame holds the other end of the guide shaft.

The guide shaft is arranged to at least partially overlap the driving unit in the circumferential direction around the optical axis, and the first lens is arranged to at least partially overlap the adjusting mechanism in the radial direction relative to the optical axis. The second portion has a pressure axis that coincides with the direction of pressure being applied by the second portion to the first portion. The pressure axis is positioned away from the driving unit.

These and other features, aspects and advantages of the technology disclosed herein will become apparent to those skilled in the art from the following detailed description, which, taken in conjunction with the annexed drawings, discloses a preferred and example embodiments of the present invention.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

<Overview of Digital Camera>

Figure 1:
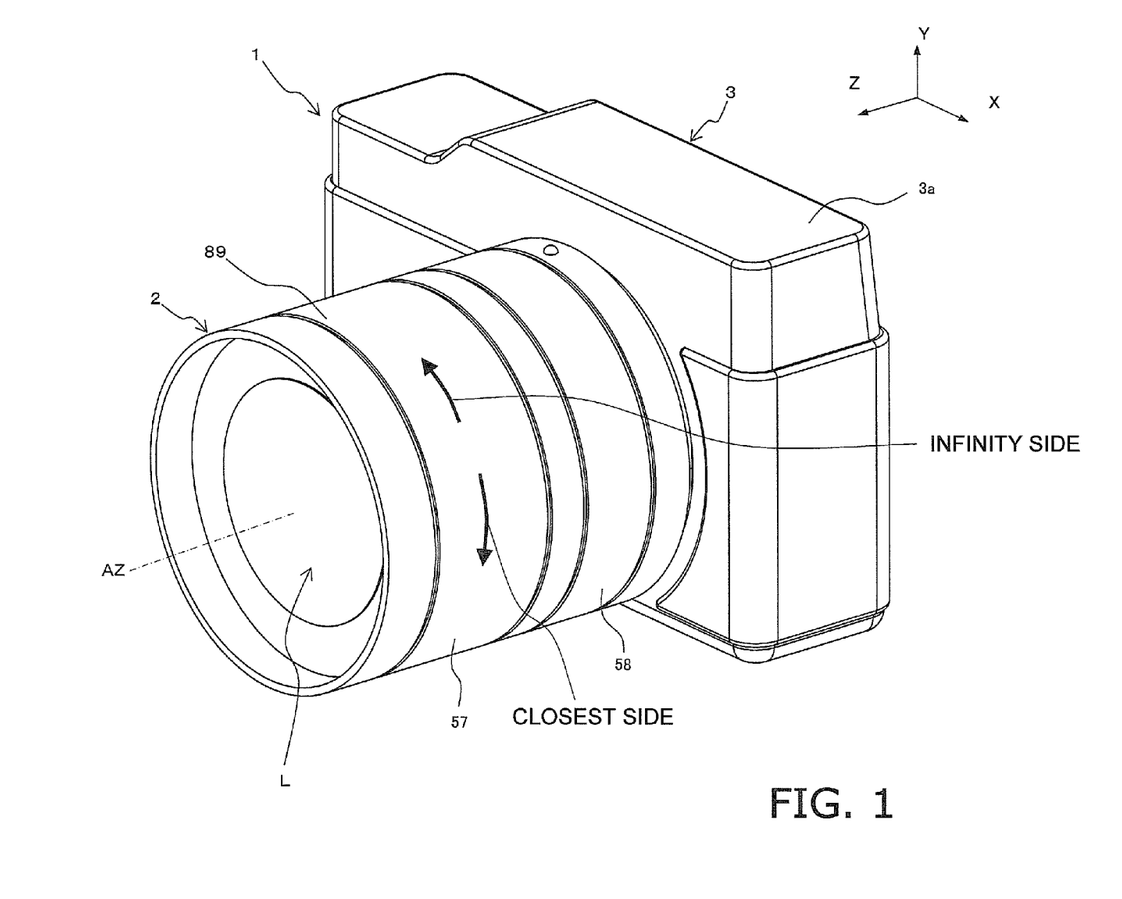
FIG. 1 is a schematic perspective view of a digital camera.

A digital camera 1 will be hereinafter explained with reference to FIGS. 1 to 9. FIG. 1 is a schematic perspective view of the digital camera 1. As illustrated in FIG. 1, the digital camera 1 is of an interchangeable lens type and mainly includes a camera body 3 and an interchangeable lens unit 2 (an example of a lens barrel). The interchangeable lens unit 2 is detachably attached to the camera body 3.

Figure 2:
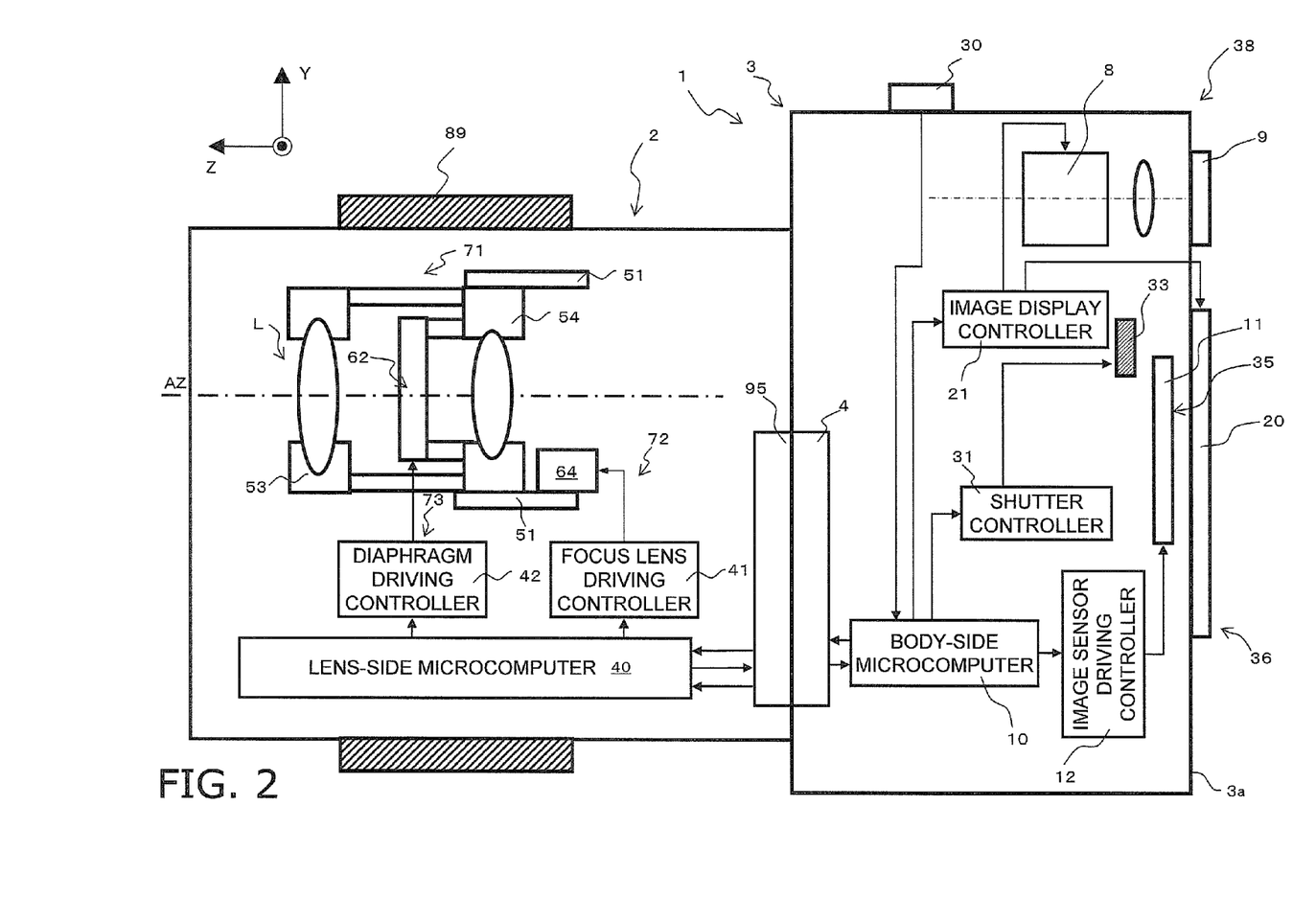
FIG. 2 is a schematic configuration of a digital camera.
Figure 3A:
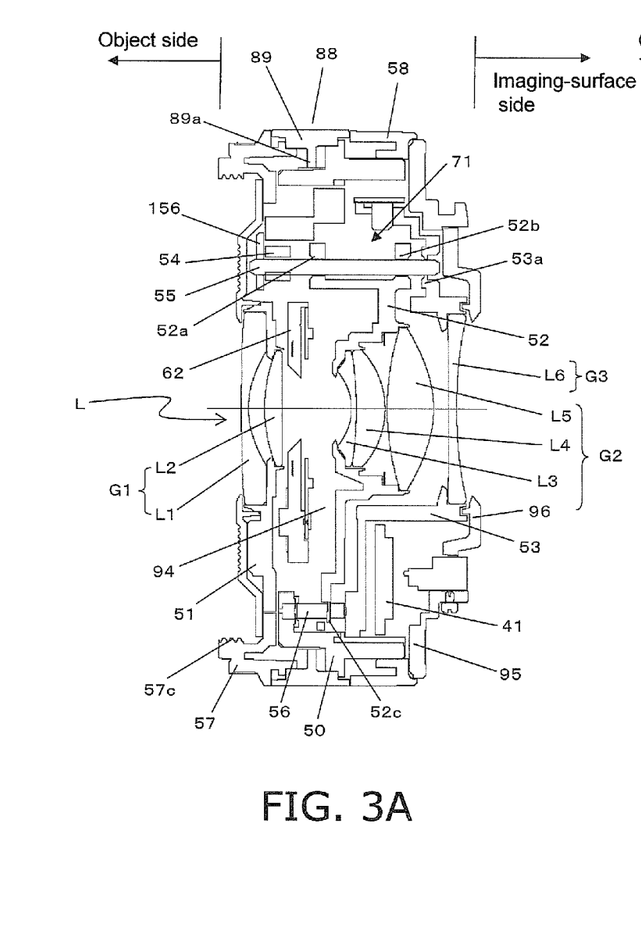
FIG. 3A is a first schematic cross-sectional view of an interchangeable lens unit.
Figure 3B:
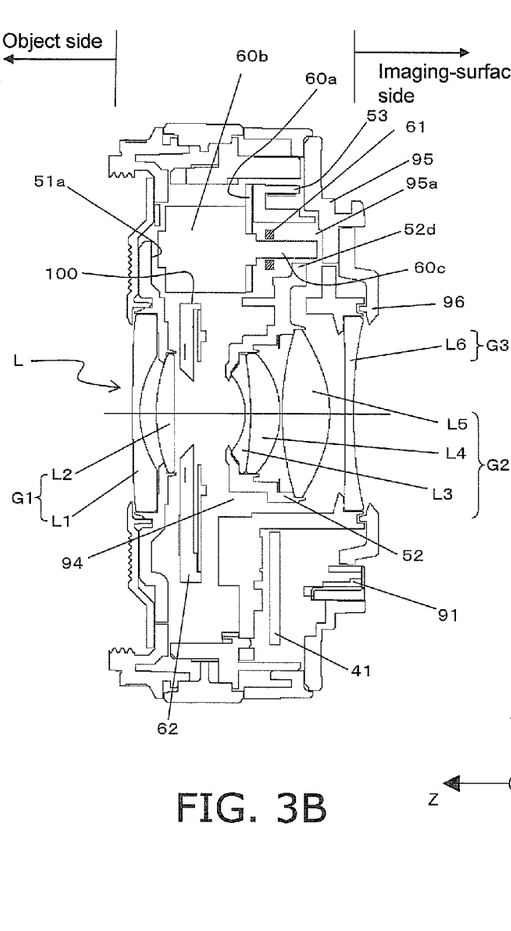
FIG. 3B is a second schematic cross-sectional view of the interchangeable lens unit.
Figure 4A:
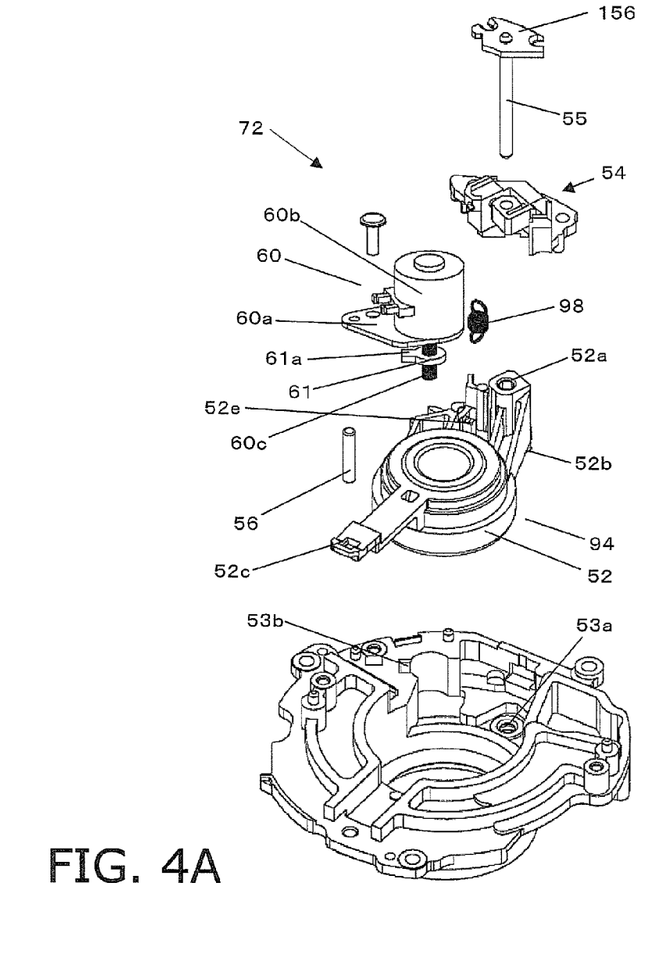
FIG. 4A is an exploded perspective view of a driving part of a focus movable unit.
Figure 4B:
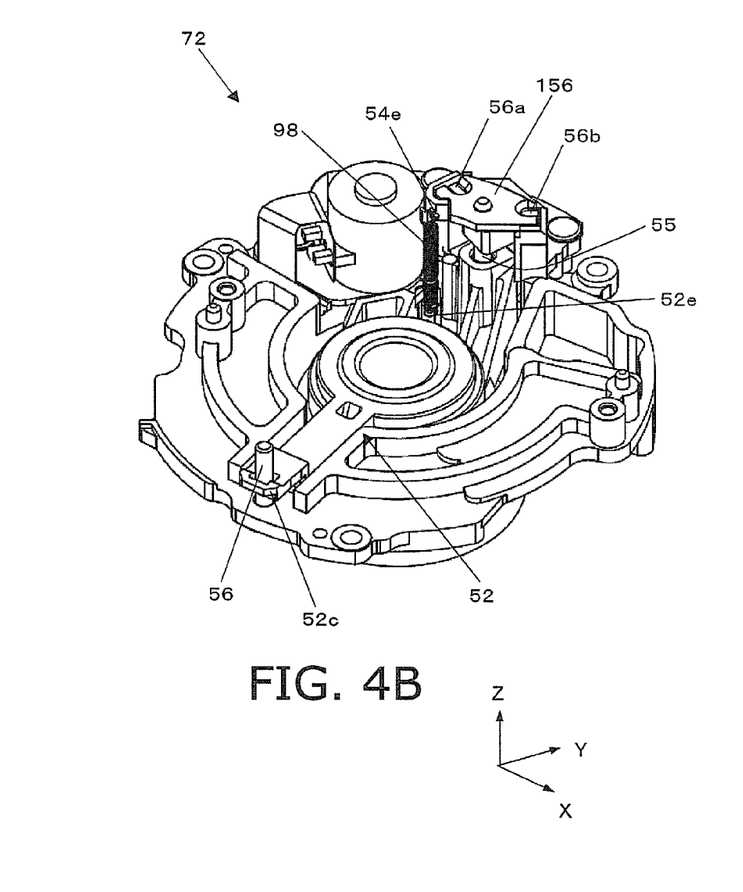
FIG. 4B is a perspective view of the driving part of the focus movable unit.
Figure 5A:
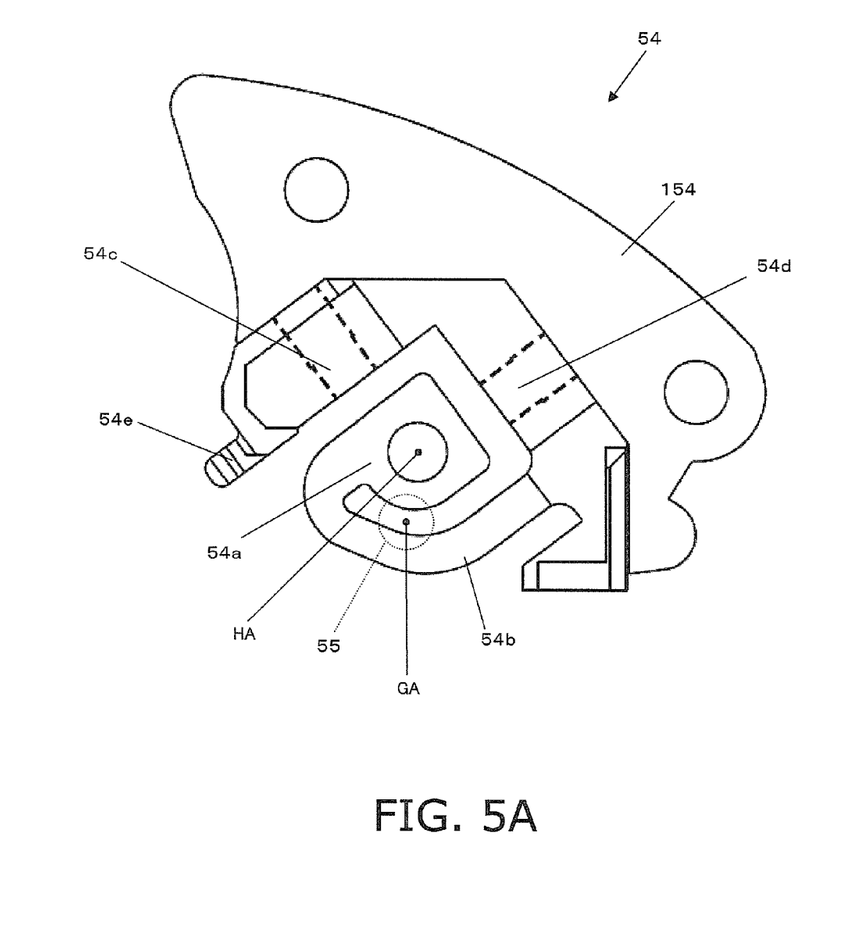
FIG. 5A is a front view of an adjusting mechanism.
Figure 5B:
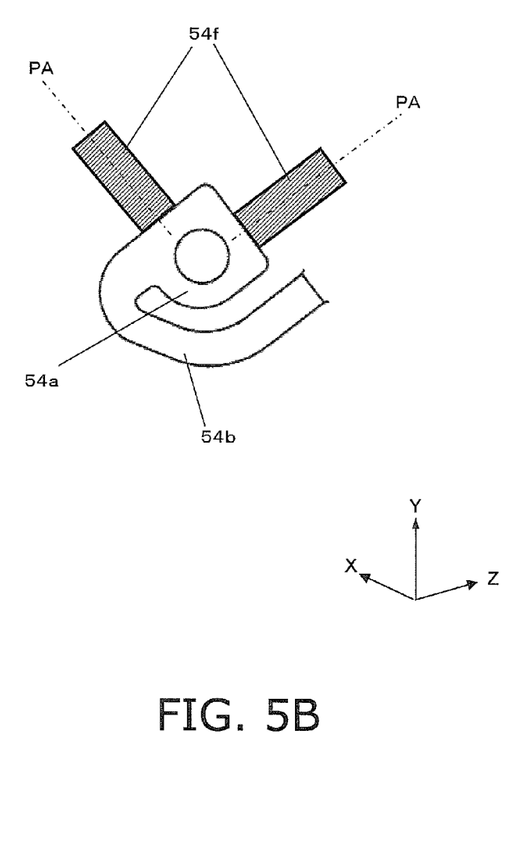
FIG. 5B is a partial front view of the adjusting mechanism.
Figure 6:
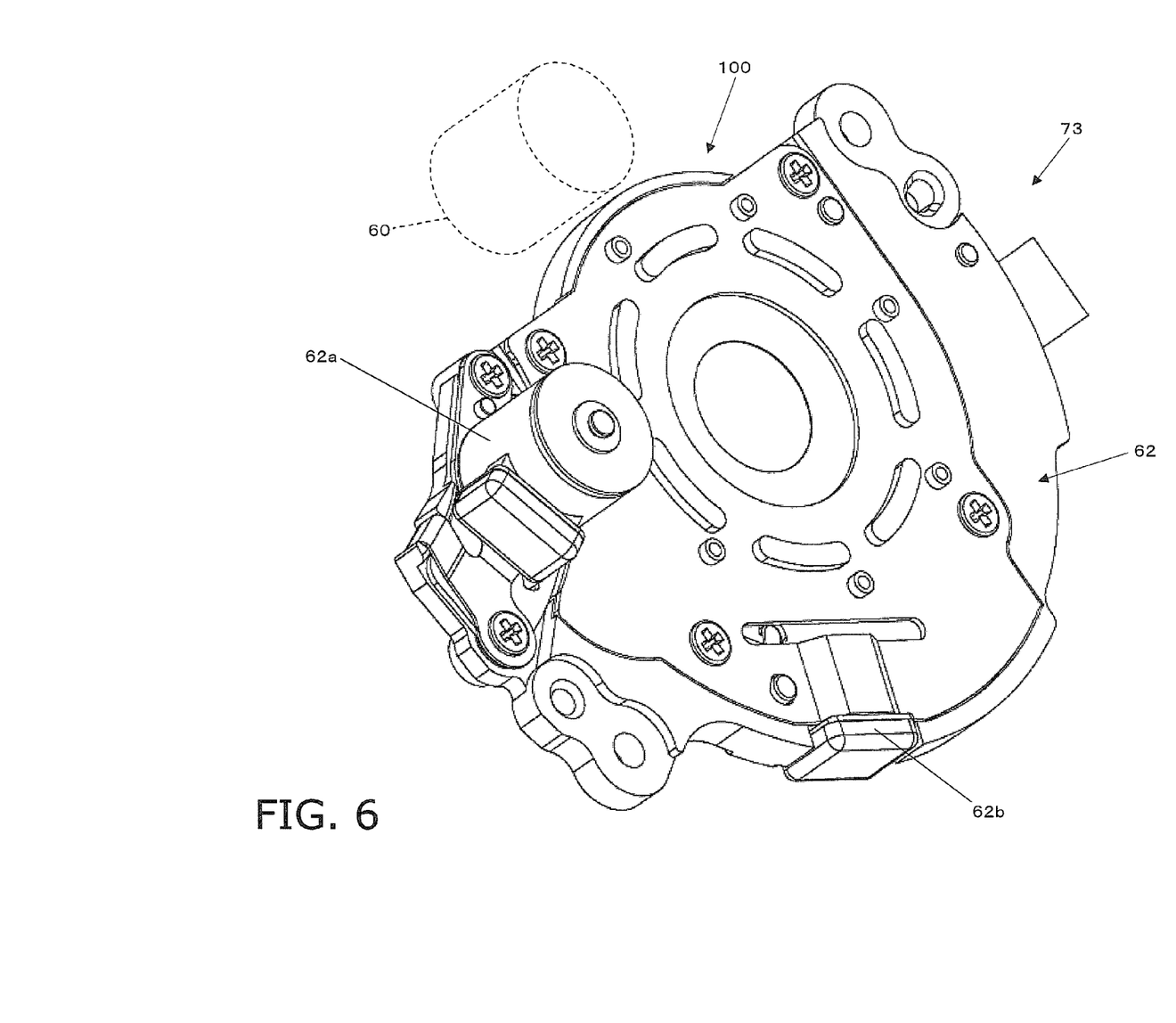
FIG. 6 is a schematic perspective view of a diaphragm adjusting unit.
Figure 7:
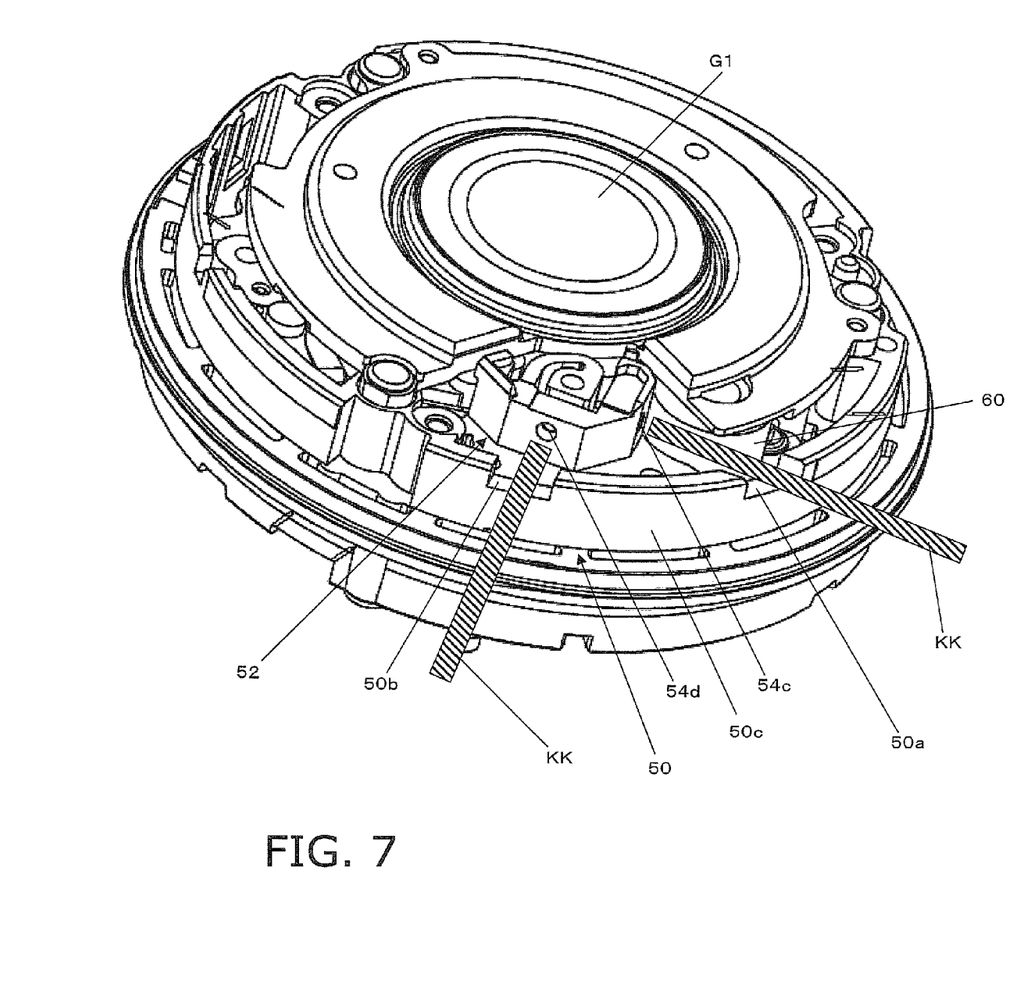
FIG. 7 is a schematic perspective view of the interchangeable lens unit.
Figure 8:
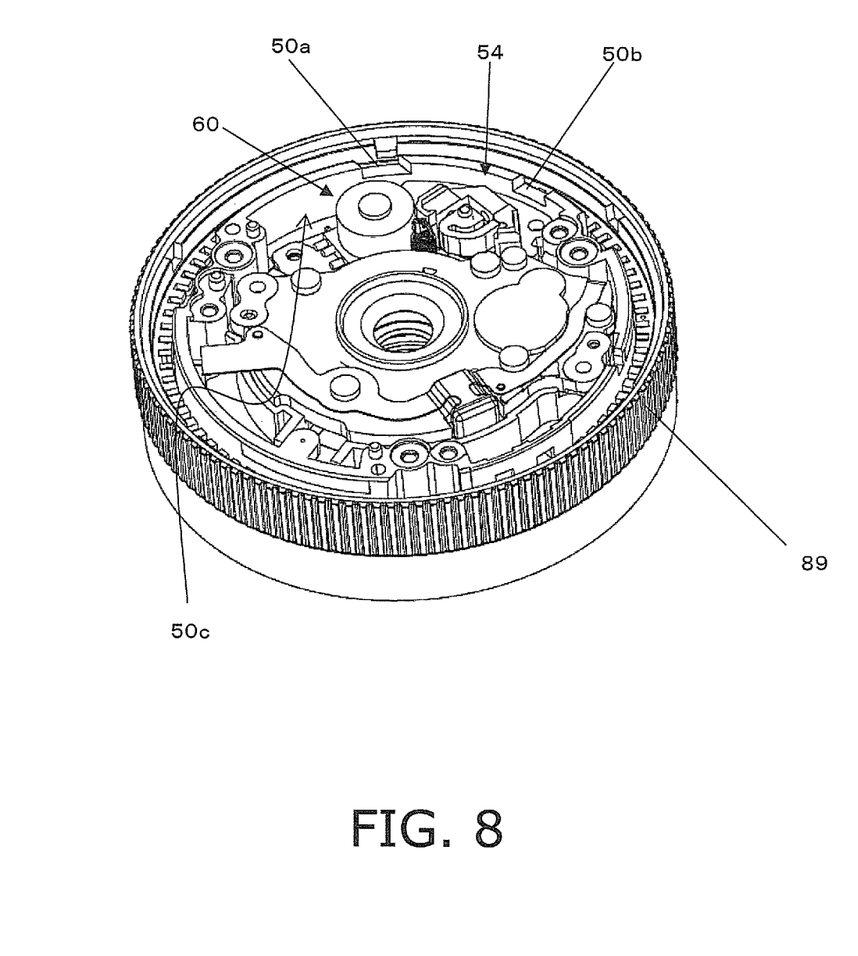
FIG. 8 is a schematic perspective view of the interchangeable lens unit.
Figure 9A:
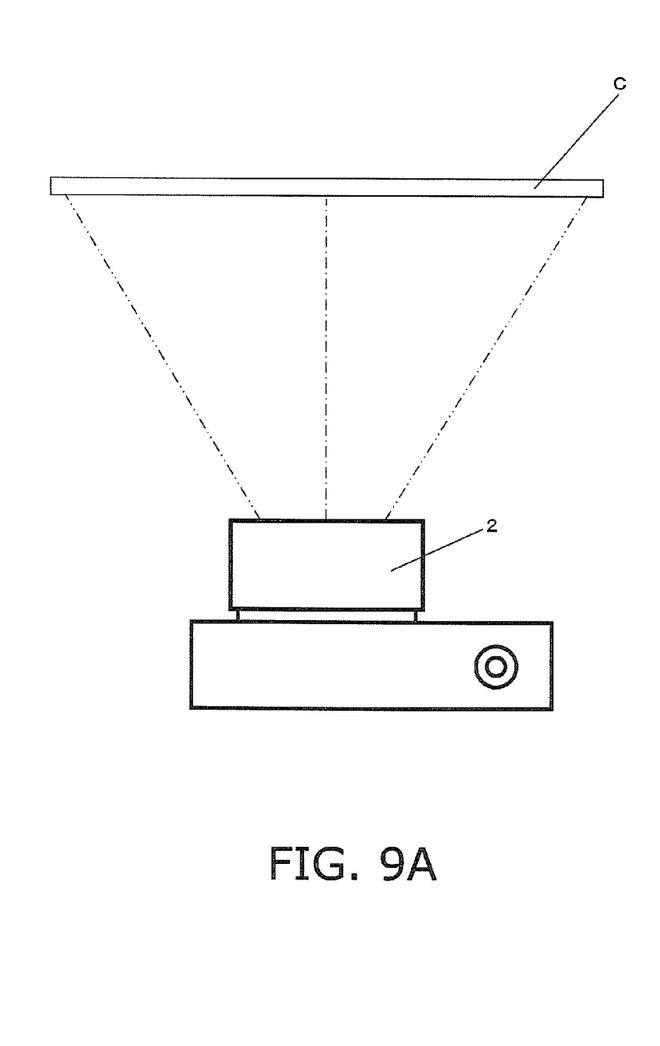
FIG. 9A is a schematic diagram for explaining an adjusting method (prior to attachment of an adjusting tool)
Figure 9B:
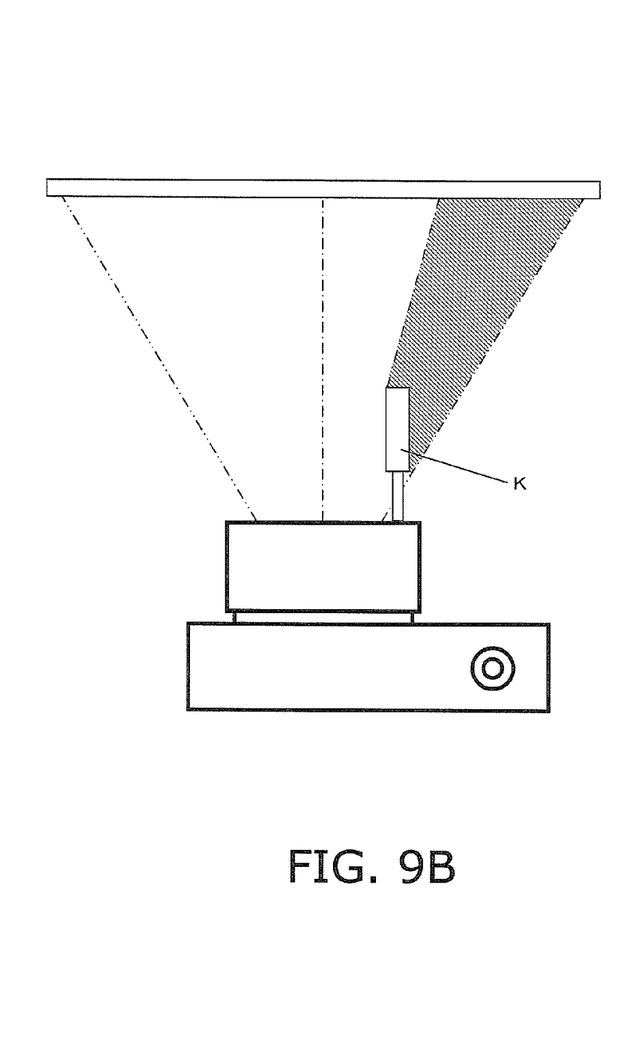
FIG. 9B is a schematic diagram for explaining an adjusting method (during attachment of the adjusting tool).

FIG. 2 shows a schematic configuration of the digital camera 1. As illustrated in FIG. 2, the interchangeable lens unit 2 is mounted through a lens-side mount 95 to a body-side mount 4 disposed on the front face of the camera body 3. FIG. 3A shows a schematic cross-sectional view of the interchangeable lens unit 2 sectioned along a plane including a primary focus shaft 55 (one example of a guide shaft) and the optical axis. FIG. 3B shows a schematic cross-sectional view of the interchangeable lens unit 2 sectioned along a plane including a stepper motor 60b and the optical axis. FIG. 4A shows an exploded perspective view of a driving part of a focus movable unit 94. FIG. 4B shows a perspective view of the driving part of the focus movable unit 94. FIG. 5A is a front view of an adjusting mechanism 54. FIG. 5B is a partial front view of the adjusting mechanism 54. FIG. 6 is a schematic perspective view of a diaphragm adjusting unit 73. FIGS. 7 and 8 are schematic perspective views of the interchangeable lens unit 2. FIG. 9A is a schematic diagram showing an adjusted state prior to attachment of an adjusting tool. FIG. 9B is a schematic diagram showing the adjusted state after the attachment of the adjusting tool.

In the present exemplary embodiment, a three-dimensional Cartesian coordinate system is set up for the digital camera 1. As illustrated in FIG. 1, an optical axis AZ of an optical system L to be described is set parallel to the Z axis direction (an example of an optical axis direction). The X axis direction is set parallel to the horizontal direction in the landscape position of the digital camera 1. The Y axis direction is set parallel to the vertical direction in the landscape position of the digital camera 1. In the following explanation, the term "front" refers to an object side (i.e., a positive side in the Z axis direction) of the digital camera 1, whereas the term "rear" refers to a user side opposite to the object side (i.e., a negative side in the Z axis direction) of the digital camera 1.

<Camera Body>

The schematic structure of the camera body 3 will be hereinafter explained with reference to FIGS. 1 and 2. As illustrated in FIG. 1, the camera body 3 includes a chassis 3a and the body-side mount 4. As illustrated in FIG. 2, the chassis 3a includes an image obtaining part 35, an image display part 36, a finder part 38 and a body-side microcomputer 10.

(1) Chassis

As illustrated in FIG. 1, the chassis 3a is provided as the exterior cladding of the camera body 3. As illustrated in FIG. 2, the chassis 3a includes a display 20 and a viewfinder window 9 on the rear face thereof. Further, the chassis 3a includes a shutter button 30 on the top face thereof.

(2) Body-Side Mount

The body-side mount 4 is a part of the interchangeable lens unit 2 where the lens-side mount 95 is attached. As illustrated in FIG. 2, the body-side mount 4 is disposed on the front face of the chassis 3a. The body-side mount 4 includes a body-side contact (not illustrated in the figures) electrically connectable to a lens-side contact 91 (see FIG. 3B) of the interchangeable lens unit 2. The camera body 3 can send/receive data to/from the interchangeable lens unit 2 through the body-side mount 4 and the lens-side mount 95.

(3) Image Obtaining Part

The image obtaining part 35 mainly includes an image sensor 11 (an example of an image sensor), a shutter unit 33, a shutter controller 31 and an image sensor driving controller 12. The image sensor 11 is configured to convert an optical image formed by the optical system L into an electric signal. An example of the image sensor 11 is a CCD (charge coupled device) sensor. The shutter unit 33 is configured to adjust an exposure condition of the image sensor 11. The shutter controller 31 is configured to control driving of the shutter unit 33 based on a control signal from the body-side microcomputer 10. The image sensor driving controller 12 is configured to control actions of the image sensor 11.

(4) Body-Side Microcomputer

The body-side microcomputer 10 functions as the main controller of the camera body 3. The body-side microcomputer 10 is configured to control respective components in the digital camera 1 in response to operating information inputted into an operating unit 39. Specifically, the body-side microcomputer 10 is embedded with a CPU, a ROM and a RAM. The body-side microcomputer 10 is configured to load programs stored in the ROM into the CPU for realizing a variety of functions.

For example, the body-side microcomputer 10 has a function of detecting attachment of the interchangeable lens unit 2 to the camera body 3 and a function of obtaining information required for controlling the digital camera 1 such as information of the focal distance from the interchangeable lens unit 2. Further, the body-side microcomputer 10 is configured to control the focus adjusting unit 72 through a lens-side microcomputer 40. The lens-side microcomputer 40 is configured to obtain positional information of the focus movable unit 94.

(5) Image Display Part

The image display part 36 includes the display 20 and an image display controller 21. An example of the display 20 is a LCD (liquid crystal display) monitor. The display 20 is configured to display an image signal recorded in the memory as a visible image based on a command from the image display controller 21. The display 20 is herein assumed to have a display form of displaying only the image signal as the visible image and a display form of displaying both the image signal and information in shooting as the visible image.

(6) Finder Part

The finder part 38 includes a LCD finder 8 and the viewfinder window 9. The LCD finder 8 is configured to display the image obtained by the image sensor 11. The viewfinder window 9 is disposed on the rear face of the chassis 3a. A user can visually check the image displayed on the LCD finder 8 by looking through the viewfinder window 9.

<Interchangeable Lens Unit>

The schematic structure of the interchangeable lens unit 2 will be hereinafter explained with reference to FIGS. 1 to 9. As illustrated in FIG. 2, the interchangeable lens unit 2 includes the optical system L (an example of an image optical system), a lens support mechanism 71 supporting the optical system L, the focus adjusting unit 72 and the diaphragm adjusting unit 73. Further, the interchangeable lens unit 2 is embedded with the lens-side microcomputer 40.

(1) Optical System

The optical system L is a lens system for forming an optical image of an object. Specifically, the optical system L is formed by 6 types of lenses as illustrated in FIGS. 3A and 3B. A first lens L1 is a meniscus lens having a convex surface on the object side. The image-sensor-side surface and the object-side surface of the first lens L1 are both aspheric surfaces. A second lens L2 is a meniscus lens having a convex surface on the object side. The first and second lenses L1 and L2 form a first lens group G1 (an example of a first lens).

A third lens L3 is a meniscus lens having a concave surface on the object side. The third lens L3 is joined to a fourth lens L4 through an adhesive layer. A fifth lens L5 is a convex lens having convex surfaces on the both sides. The image-sensor-side surface and the object-side surface of the fifth lens L5 are both aspheric surfaces. The third, forth and fifth lenses L3, L4 and L5 form a second lens group G2 (an example of a second lens).

A sixth lens L6 is a concave lens having concave surfaces on the both sides. The image-sensor-side surface of the sixth lens L6 is an aspheric surface. The sixth lens L6 is formed by at least one lens. The sixth lens L6 forms a third lens group G3 (an example of a third lens). The term "group" (i.e., the third group) is herein used for the sake of explanatory convenience although the "group" is formed by only the sixth lens L6.

It should be noted that a diaphragm unit 62 is disposed between the first lens group G1 and the second lens group G2. Specifically, the diaphragm unit 62 is disposed between the second lens L2 and the third lens L3.

The optical system L is a single focus lens not a so-called zoom lens. In other words, the focal distance of the optical system L is constant. In this case, the third, fourth and fifth lenses L3, L4 and L5 are configured to be unitarily moved towards the object while keeping a constant distance from each other in focusing from an infinity focus condition to a closest focus condition. By contrast, the third, forth and fifth lenses L3, L4 and L5 are configured to be unitarily moved towards the image sensor while keeping a constant distance from each other in focusing from the closest focus condition to the infinity focus condition. In the present exemplary embodiment, the second lens group G2 (focus lens group), formed by the third, forth and fifth lenses L3, L4 and L5, is configured to be moved in the optical axis direction in order to adjust the focus condition of the optical image of the object. Where a unit formed by the second lens group G2 and a second lens holding frame 52 is herein referred to as the focus movable unit 94 (see FIGS. 3A and 3B), the focus movable unit 94 is configured to be unitarily moved in focusing.

(2) Lens Support Mechanism

The lens support mechanism 71 supports the focus movable unit 94 for allowing the focus movable unit 94 to move along the Z direction. As illustrated in FIGS. 3A and 3B, the lens support mechanism 71 includes the lens-side mount 95, a fixed frame 50, a first lens holding frame 51, the second lens holding frame 52, a third lens holding frame 53 (one example of a base frame), the adjusting mechanism 54, the primary focus shaft 55, a secondary focus shaft 56, a focus ring unit 88 and an urging spring 98 (see FIGS. 4A and 4B). The respective components will be hereinafter explained.

The lens-side mount 95 is a part to be attached to the body-side mount 4 of the camera body 3. As illustrated in FIG. 3B, the lens-side mount 95 is provided with the lens-side contact 91. A shade frame 96 is attached to the lens-side mount 95 for blocking unnecessary light.

As illustrated in FIG. 3A, the fixed frame 50 is a member for supporting the first lens holding frame 51, the third lens holding frame 53, a front frame 57 (one example of a second frame member) and a rear frame 58 (one example of a first frame member). The fixed frame 50 is fixed to the lens-side mount 95. As illustrated in FIGS. 7 and 8, the fixed frame 50 includes a wall portion 50c. The wall portion 50c includes notches 50a and 50b.

As illustrated in FIG. 3A, the first lens holding frame 51 holds the first and second lenses L1 and L2. The first lens holding frame 51 includes screw holes (not illustrated in the figures) used for fixing the first lens holding frame 51 and the fixed frame 50 by means of screws.

As illustrated in FIG. 3A, the second lens holding frame 52 is engaged with the primary and secondary focus shafts 55 and 56. The second lens holding frame 52 is thereby supported while being movable along the primary focus shaft 55 in the optical axis direction. With the secondary focus shaft 56, the second lens holding frame 52 is also restricted from rotating about the primary focus shaft 55. The imaging-surface-side end of the primary focus shaft 55 is held by a primary shaft holding portion 53a of the third lens holding frame 53, while the object-side end thereof is held by the adjusting mechanism 54. The adjusting mechanism 54 is attached to the third lens holding frame 53 (e.g., the primary shaft holding portion 53a). Meanwhile, the imaging-surface-side end of the secondary focus shaft 56 is held by the third lens holding frame 53, while the object-side end thereof is held by the fixed frame 50.

As illustrated in FIGS. 3A and 3B, the second lens holding frame 52 holds the third, fourth and fifth lenses L3, L4 and L5. As illustrated in FIGS. 3A and 4A, the second lens holding frame 52 includes guide holes 52a and 52b fitted onto the primary focus shaft 55 and a rotation restricting portion 52c fitted onto the secondary focus shaft 56. The rotation restricting portion 52c restricts rotation of the second lens holding frame 52. For example, the rotation restricting portion 52c is an elongated hole extended in the radial direction of the second lens holding frame 52. The rotation restricting portion 52c includes, for instance, two wall portions parallel to a straight line connecting the primary focus shaft 55 and the secondary focus shaft 56. The wall portions are opposed to each other in the circumferential direction of the elongated hole 52. The secondary focus shaft 56 is abutted to the wall portions for restricting rotation of the second lens holding frame 52.

As illustrated in FIG. 3B, the second lens holding frame 52 includes an abutted portion 52d to be abutted to a nut 61 to be described. As illustrated in FIG. 4B, the second lens holding frame 52 further includes a first pawl 52e to be engaged with an end of the urging spring 98 to be described.

As illustrated in FIGS. 3A and 3B, the third lens holding frame 53 supports the sixth lens L6.

As illustrated in FIGS. 5A and 5B, the adjusting mechanism 54 includes a main body 154, a primary focus shaft holding portion 54e (one example of a holding portion), an arm portion 54b (one example of a coupling portion), a first hole 54c, a second hole 54d, a second pawl 54e and pressure screws 54f (one example of a second portion or pressure portion). The primary focus shaft holding portion 54a is integrally formed with the arm portion 54b as a one-piece, unitary member (one example of a first portion or an elastic portion). The adjusting mechanism 54 is fixed to the fixed frame 50 by means of screws or the like. The primary focus shaft 55 is press-inserted and fixed into the primary focus shaft holding portion 54a.

The first and second holes 54c and 54d are made of resin or the like. Each of the first and second holes 54c and 54d has a diameter less than that of the pressure screw 54f. The pressure screws 54f are herein fitted with the first and second holes 54c and 54d by screwing the pressure screws 54f therein.

The axis of the first hole 54c (an example of a pressure axis) and the axis of the second hole 54d (an example of the pressure axis) are set in positions away from a focus motor unit 60 at a predetermined distance. Specifically, the axis of the first hole 54c is positioned for setting the perpendicular distance between the rotary shaft of the stepper motor 60b and the axis of the first hole 54c to be greater than the sum of a first distance from the rotary shaft of the stepper motor 60b to the outer surface thereof and a second distance corresponding to the radius of each pressure screw 54f. More specifically, the first distance is a distance from the axis of the rotary shaft of the stepper motor 60b to the outer surface, which is closer to the axis of the first hole 54c, of the stepper motor 60b.

When the axis position, i.e., the axial direction (an example of a first direction) of the first hole 54c is thus set, the axis of the second hole 54d is arranged in a direction perpendicular to the axis of the first hole 54c (an example of a second direction). The first and second holes 54c and 54d are herein disposed on the same plane perpendicular to the optical axis.

One of the two holes, closer to the focus motor unit 60, is herein set as the first hole 54c. Therefore, the second hole 54d is set based on the first hole 54c. Likewise, the first hole 54c is set based on the second hole 54d, for instance, when the second hole 54d is disposed closer to the focus motor unit 60 than the first hole 54d is.

The primary focus shaft holding portion 54a is herein pushed or pulled in two directions perpendicular to the optical axis when the screws 54f are tightened or loosened while being fitted with the first and second holes 54c and 54d. The arm portion 54b is thereby elastically deformed and the primary focus shaft holding portion 54a is translated within the plane perpendicular to the optical axis. The tilt of the primary focus shaft 55 is thus adjusted while the image-sensor side end of the primary focus shaft 55 is fixed in the primary shaft holding portion 53a. It should be noted that the axes of the first and second holes 54c and 54d are extended in the push-and-pull directions of the screws 54f.

The second lens holding frame 52 is urged towards the object in the optical axis direction by means of the urging spring 98 (see FIGS. 4A and 4B) to be engaged with the first pawl 52e and the second pawl 54e of the adjusting mechanism 54. The abutted portion 52d and the nut 61 are abutted to each other by means of the urging force (see FIG. 3B). The position of the second lens holding frame 52 is thereby restricted in the optical axis direction.

As illustrated in FIGS. 4A and 4B, the urging spring 98 is disposed roughly parallel to and in the vicinity of the primary focus shaft 55. In other words, the first pawl 52e is formed in the second lens holding frame 52 while the second pawl 54e is formed in the adjusting mechanism 54, so that the urging spring 98 can be disposed roughly parallel to the primary focus shaft 55. With the structure, eccentric moment is inhibited from being produced in primary focus shaft 55 by means of the urging force of the urging spring 98.

The free length of the urging spring 98 is set for constantly producing urging force within a movable range of the second lens holding frame 52. An example of the urging spring 98 is herein a tension spring. It should be noted that the urging spring 98 may be disposed on the imaging-surface side of the second lens holding frame 52 in the optical axis direction and may be urged towards the object by means of a compression spring or the like.

The focus ring unit 88 includes a focus ring 89, the front frame 57 and the rear frame 58. As illustrated in FIGS. 1, 3A and 8, the focus ring 89 is a cylindrical member. The focus ring 89 is rotatably supported about the optical axis AZ by the front and rear frames 57 and 58 while being prevented from moving in the Z-axis direction. The front and rear frames 57 and 58 are attached to the fixed frame 50. The front frame 57 includes a female threaded portion 57c on the front part thereof for attaching an optical filter (e.g., a polarizing filter or a protective filter) and/or a conversion lens thereto.

(3) Focus Adjusting Unit

As illustrated in FIGS. 4A and 4B, the focus adjusting unit 72 includes the focus motor unit 60 and a focus driving controller 41 (see FIGS. 3A and 3B). As illustrated in FIG. 3B, the focus motor unit 60 is fixed to the third lens holding frame 53 through a focus motor sheet metal 60a by means of screws or the like. The focus motor unit 60 is configured to drive the second lens holding frame 52 in the optical axis direction.

For example, the focus motor unit 60 is formed by the stepper motor 60b, a screw 60c and the nut 61. The nut 61 includes a female threaded portion and is screwed onto the screw 60c. As illustrated in FIG. 4A, a protrusion 61a of the nut 61 is engaged with a groove 53b formed on the third lens holding frame 53 in order to restrict rotation of the nut 61. With the structure, the nut 61 is configured to be moved parallel to the optical axis direction when the screw 60c is rotationally driven by the stepper motor 60b.

The focus driving controller 41 is configured to drive a focus motor 64 (see FIG. 2).

(4) Diaphragm Adjusting Unit

As illustrated in FIG. 6, the diaphragm adjusting unit 73 includes the diaphragm unit 62 and a diaphragm driving motor 62a configured to drive the diaphragm unit 62. An example of the diaphragm driving motor 62a is a stepper motor. The diaphragm driving motor 62a is configured to be driven based on a driving signal to be inputted therein from a diaphragm driving controller 42 (see FIG. 2). Diaphragm blades are driven in an opened or closed direction by means of driving force produced in the diaphragm driving motor 62a in order to change the shape of the aperture formed by the diaphragm blades. The f-number of the optical system L is changed in conjunction with driving of the diaphragm blades. For example, a photosensor 62b is configured to detect a specific aperture stop (e.g., maximum aperture diameter). The aperture shape is then set based on the maximum aperture diameter.

(5) Lens-Side Microcomputer

The lens-side microcomputer 40 includes a CPU, a ROM and a memory. The lens-side microcomputer 40 can realize a variety of functions by loading programs stored in the ROM into the CPU.

<Arrangement of Focus Motor Unit>

Arrangement of the focus motor unit 60 will be hereinafter explained. Contradictory problems are required to be solved for achieving downsizing of the lens barrel. Specifically, it is required to reduce thickness of the lens barrel in the optical axis direction and ensure sufficient displacement of the focus movable unit 94. Sufficient length is required to be ensured for the screw 60c in the optical axis direction in order to ensure sufficient displacement of the focus movable unit 94. In other words, it is essential to maximally ensure the length of the focus motor unit 60 in the optical axis direction within the lens barrel.

In view of the above, the lens-side mount 95 includes a notch 95a in the present exemplary embodiment as illustrated in FIG. 3B. The notch 95a serves to accommodate the screw 60c, the nut 61 and the abutted portion 52d. The notch 95a is formed in the vicinity of the third lens holding frame 53. The sufficient length of the screw 60c is herein ensured by accommodating the focus motor unit 60 in the notch 95a through the third lens holding frame 53. Further, the first lens holding frame 51 partially includes a notch 51a in order to further sufficiently ensure the length of the screw 60c. The notch 51a accommodates a part of the stepper motor 60b. The stepper motor 60b can be thereby disposed in the front part of the lens barrel and sufficient length can be ensured for the screw 60c.

In the normal image optical systems (i.e., the conventional image optical systems), the diaphragm unit 62 is disposed between the lens-side mount 95 and the first lens group in the optical axis direction. In the image optical systems, the outer diameter of the diaphragm unit is often greater than that of the respective lens groups forming the image optical system. To prevent spatial interference between the diaphragm unit 62 and the focus motor unit 60, the focus motor unit 60 is herein disposed closer to the imaging surface than the diaphragm unit 62 is. In other words, only a limited space is available for disposing the focus motor unit 60 between the diaphragm unit 62 and the lens-side mount 95. The length of the screw 60c is thereby required to be shortened.

By contrast, a part of the diaphragm unit 62, overlapping with the focus motor unit 60, is cut out in the present exemplary embodiment as illustrated in FIG. 6. The notch 100 is formed for allowing the focus motor unit 60 to pass through the diaphragm unit 62 in the optical axis direction. Further, the first lens holding frame 51 is partially cut out, and the cut-out portion (i.e., the notch 51a) accommodates a part of the focus motor unit 60 (see FIG. 3B). With the arrangement of the focus motor unit 60, sufficient length can be ensured for the screw 60c. In this case, the notch 100 of the diaphragm unit 62 is desirably cut out in a position closer to the optical axis than the notch 95a of the lens-side mount 95 is. Further, the notch 100 of the diaphragm unit 62 is desirably cut out in a position closer to the optical axis than the optical-axis-side outer surface of the focus motor unit 60.

If the radial position of the notch 100 of the diaphragm unit 62 is herein overlapped with the notch 95a of the lens-side mount 95 in the optical axis direction, the focus motor unit 60 is required to be disposed outside to the extent possible. In this case, the notch 95a of the lens-side mount 95 cannot be effectively used. Therefore, sufficient length cannot be ensured for the screw 60c. In other words, chances are that the radial size of the lens barrel is increased.

In view of the above, the focus motor unit 60 in the present exemplary embodiment is disposed outside the notch 100 of the diaphragm unit 62 and simultaneously inside the notch 95a of the lens-side mount 95, while being overlapped with the lens-side mount 95 and the first lens holding frame 51. Sufficient length can be thereby ensured for the screw 60c while the lens barrel can be downsized in both of the thickness direction and the radial direction.

Specifically, the focus motor unit 60 and the primary focus shaft 55 are herein overlapped with the diaphragm unit 62 for reducing the thickness of the interchangeable lens unit 2 as seen in a direction perpendicular to the optical axis. In other words, the focus motor unit 60 and the primary focus shaft 55 are aligned in the circumferential direction while being respectively disposed outside and adjacent to the diaphragm unit 62. Further, the focus motor unit 60 and the primary focus shaft 55 are herein disposed at roughly the same height in the optical axis direction. For example, the object-side part of the focus motor unit 60 and that of the primary focus shaft 55 are aligned in the circumferential direction. Accordingly, the focus motor unit 60 and the adjusting mechanism 54 are also aligned in the circumferential direction while being respectively disposed outside and adjacent to the diaphragm unit 62. Further, the focus motor unit 60 and the primary focus shaft 55 are herein disposed inside (i.e., closer to the optical axis) to the extent possible in order to further reduce the diameter of the interchangeable lens unit 2. For example, the focus motor unit 60 and the primary focus shaft 55 are disposed adjacent to the notch 100 of the diaphragm unit 62.

As a result, the focus motor unit 60 and the primary focus shaft 55 are disposed roughly concentric to each other while being disposed closer to the optical axis to the extent possible. With the arrangement, the tilt of the primary focus shaft 55 can be adjusted based on two axes from the outside of the interchangeable lens unit 2. The directions of the axes are set for avoiding spatial interference with the focus motor unit 60. Specifically, the directions of the axes are set for avoiding spatial interference with the diaphragm unit 62, the focus motor unit 60 and a joint part between the first lens holding frame 51 and the fixed frame 50.

With the structure, it is possible to provide the interchangeable lens unit 2 for reducing thickness and size thereof and for easily adjusting the optical axis.

In the present exemplary embodiment, the lens driving structure is formed using the nut 61 and the urging spring 98. In the present technology, however, other structures such as a rack structure may be formed instead. Further, the stepper motor is used as the driving unit in the present exemplary embodiment. However, any other suitable driving units such as a DC motor or an electromagnetic linear actuator may be used instead.

<Guide Mechanism for Second Lens Holding Frame>

Arrangement of components forming the guide mechanism for the second lens holding frame 52 will be hereinafter explained with reference to FIGS. 3 and 4.

As described above, the second lens holding frame 52 is guided along the optical axis direction through the primary focus shaft 55 fitted into the guide holes 52a and 52b (see FIG. 3A). Further, the second lens holding frame 52 is restricted from rotating about the primary focus shaft 55 by the fitting between the secondary focus shaft 56 and the rotation restricting portion 52c (see FIG. 4B). Clearances are herein produced between the primary focus shaft 55 and the guide holes 52a and 52b, and this caused wobble. Therefore, the second lens holding frame 52 produces a tilt error within the range of the clearance-related wobble, for instance, in changing the posture of the lens barrel. The tilt error due to the clearance-related wobble can be reduced in proportion to increase in the guide span (i.e., interval between the guide holes 52a and 52b). Therefore, it is desirable to sufficiently ensure the guide span for accurately driving the second lens holding frame 52.

Further, the length of the primary focus shaft 55 is normally determined mainly by the guide span and the length corresponding to the displacement of the second lens group. Therefore, the length of the primary focus shaft 55 is increased in proportion to increase in the guide span. In the present exemplary embodiment, however, the focus shaft 55 is disposed in the notch and so forth, similarly to the aforementioned focus motor unit 60. Therefore, the primary focus shaft 55 can be accommodated therein while sufficient length can be ensured for the primary focus shaft 55. In other words, a sufficient guide span can be ensured.

<Adjusting Mechanism and Adjusting Method Thereof>

A tilt adjusting mechanism for the primary focus shaft and an adjusting method thereof will be hereinafter explained.

First, the procedure for the adjustment will be explained. Sufficient accuracy may not be achieved for positioning and posturing of the respective first to sixth lenses L1 to L6 only by simply assembling the lenses L1 to L6 and components supporting the lenses L1 to L6. Therefore, chances are that required optical performance cannot be satisfied. In view of this, the posture of a part of the lenses (the second lens group G2 in this case) is adjusted for enhancing the optical performance. An exemplary adjusting method will be explained with reference to FIGS. 7 and 9. As illustrated in FIG. 9, a chart C for rating resolution is firstly disposed as an adjustment index, for instance, in a position away from the lens barrel at a predetermined distance in the optical axis direction on a plane perpendicular to the optical axis (see FIG. 9A). Next, the posture of the optical system L is adjusted based on a shot image of the chart C in order to fix the optical axis in a position where the best resolution can be obtained (see FIG. 9A). In the case of adjusting mechanisms that an adjusting tool K is detachably inserted along the optical axis direction (i.e., the conventional adjusting mechanisms), the chart C as a shooting object is blocked by the adjusting tool K and highly accurate adjustment will be difficult for the posture of the optical system L with respect to the entire angle of view (see FIG. 9B). In view of this, an adjusting mechanism herein required is of a type that an adjusting tool is inserted therein in a predetermined direction without blocking a chart as a shooting object. As illustrated in FIG. 7, the adjusting mechanism 54 of the present exemplary embodiment includes a structure for resolving the problem. In the adjusting mechanism 54, adjusting tools are detachably inserted therein from two directions perpendicular to the optical axis. Therefore, the shot image is not negatively affected by the structure even in executing the adjustment.

As illustrated in FIG. 7, however, multiple other components, including the lens, the focus motor unit 60 and the fixed frame 50, are disposed on a plane perpendicular to the optical axis direction in the positions of the first and second holes 54c and 54d of the adjusting mechanism 54. Therefore, the adjusting mechanism 54 is required to be structured for preventing spatial interference between the adjusting tools and the components. In view of this, the axes of the first and second holes 54c and 54d are set for positioning trajectories KK that the adjusting tools are detachably inserted into the first and second holes 54c and 54d in positional ranges that the lens, the focus motor unit 60 and so forth does not exist.

Further, the fixed frame 50 includes the notches 50a and 50b on the trajectories KK. Spatial interference can be avoided between the adjusting tools and the fixed frame 50 through the notches 50a and 50b in executing the adjustment. The fixed frame 50 includes the notch 50a in the extended direction of the axis of the first hole 54c. Further, the fixed frame 50 includes the notch 50b in the extended direction of the axis of the second hole 54d.

After the adjustment, an adhesive is applied to adhesive reservoirs 56a and 56b, and a cap 156 press-fitted onto an end of the primary focus shaft 55 is fixed to the adjusting mechanism 54 (see FIGS. 4A and 4B).

With the structure, the optical system L can be smoothly adjusted while all the lenses L1 to L6, forming the optical system L, are attached to the lens barrel. Further, the notches 50a and 50b of the fixed frame 50 are covered with the focus ring 89 and so forth as illustrated in FIG. 8. Good appearance quality can be maintained with the structure. Specifically, the notches 50a and 50b of the fixed frame 50 are covered with the front frame 57 (see FIG. 3A), the focus ring 89 and so forth in order to maintain good appearance quality. The front frame 57 and the focus ring 89 are disposed on the outer peripheral side of the fixed frame 50 and these components are assembled after the adjustment. The inner diameter of the focus ring 89 is less than the outer diameter of the lens-side mount 95. The focus ring 89 is inserted from the object side and is then disposed on the outer peripheral side of the fixed frame 50. With the focus ring 89 designed to be inserted from the object side, the outer diameter of the interchangeable lens unit 2 can be further reduced, compared to the case with the focus ring 89 designed to be inserted from the image-sensor side.

<Comprehensive Features of Interchangeable Lens Unit 2>

Comprehensive features of the interchangeable lens unit 2 of the present exemplary embodiment will be hereinafter described.

The interchangeable lens unit 2 of the present exemplary embodiment is the lens barrel with the optical system L. The interchangeable lens unit 2 of the present exemplary embodiment includes the first lens group G1, the second lens group G2, the primary focus shaft 55, the focus motor unit 60, the adjusting mechanism 54 and the third lens holding frame 53. The first lens group G1 collects light from an object. The second lens group G2 is configured to move in the optical axis direction. The primary focus shaft 55 is configured to direct the second lens group G2 in the optical axis direction. The focus motor unit 60 is configured to move the second lens group G2 along the primary focus shaft 55. The third lens holding frame 53 holds the image-sensor-side end of the primary focus shaft 55.

The adjusting mechanism 54 includes the primary focus shaft holding portion 54a, the arm portion 54b and the screws 54f. The primary focus shaft holding portion 54a and the arm portion 54b hold the object-side end of the primary focus shaft 55 and are elastically deflectable. Each screw 54f presses the primary focus shaft holding portion 54a in a direction skew to the optical axis. The adjusting mechanism 54 is configured to adjust the position of the primary focus shaft 55 when the primary focus shaft holding portion 54a is pressed by the screws 54f.

In the interchangeable lens unit 2 thus structured, the focus motor unit 60 is disposed for at least partially overlapping with the primary focus shaft 55 in the circumferential direction about the optical axis. Further, the adjusting mechanism 54 is disposed for at least partially overlapping with the first lens group G1 in the radial direction relative to the optical axis. Yet further, the axes of the first and second holes 54c and 54d are set in the positions away from the focus motor unit 60.

With the structure, it is possible to realize a small lens barrel for allowing the adjusting tools to be detachably inserted therein.

Further, the screws 54f consist of the first and second screws 54f in the interchangeable lens unit 2 of the present exemplary embodiment. The first screw 54f presses the primary focus shaft holding portion 54a in the first direction, whereas the second screw 54f presses the primary focus shaft holding portion 54a in the second direction. The first direction is herein set as a direction skew to the optical axis, whereas the second direction is set as a direction skew to both of the optical axis and the first direction.

With the structure, the position of the primary focus shaft can be adjusted based on two axes. Therefore, the optical axis can be accurately adjusted.

Also, the interchangeable lens unit 2 of the present exemplary embodiment further includes the third lens group G3 disposed on the imaging-surface side of the optical system L. The third lens group G3 is held by the third lens holding frame 53.

With the structure, the same advantageous effect as the above can be obtained even when the interchangeable lens unit 2 includes the third lens group G3.

Also, the interchangeable lens unit 2 of the present exemplary embodiment further includes the first lens holding frame 51, the second lens holding frame 52 and the fixed frame 50. The first lens holding frame 51 holds the first lens group G1. The second lens holding frame 52 holds the second lens group G2. The fixed frame 50 holds the first and third lens holding frames 51 and 53.

With the structure, respective members forming the interchangeable lens unit 2 are disposed in the optimal positions. It is thereby possible to realize a smaller and thinner lens barrel for more easily adjusting the optical axis than the conventional lens barrels.

Also, in the interchangeable lens unit 2 of the present exemplary embodiment, the fixed frame 50 includes a roughly cylindrical wall portion about the optical axis. The wall portion includes notches in intersecting positions with the pressure axes.

With the structure, it is possible to realize a small lens barrel for allowing the adjusting tools to be detachably inserted therein.

Also, the interchangeable lens unit 2 of the present exemplary embodiment further includes the focus ring 89 disposed on the outer peripheral side of the notches. The focus ring 89 is designed to be attachable thereto from the object side.

With the structure, the inner diameter of the focus ring 89 can be reduced and the outer diameter of the focus ring 89 can be accordingly reduced. Consequently, the outer diameter of the interchangeable lens unit 2 can be reduced.

Also, in the interchangeable lens unit 2 of the present exemplary embodiment, the adjusting mechanism 54 further includes the main body 154. The primary focus shaft holding portion 54a holds the object-side end of the primary focus shaft 55. The arm portion 54b couples the main body 154 and the primary focus shaft holding portion 54a. The primary focus shaft holding portion 54a and the arm portion 54b are formed so that the axis HA of the primary focus shaft holding portion 54a is closer to the main body 154 than to the axis GA of the primary focus shaft 55.

With the structure, the position of the primary focus shaft 55 can be adjusted only by pressing the primary focus shaft holding portion 54a by means of the screws 54f.

Further, the interchangeable lens unit 2 of the present exemplary embodiment further includes the fixed frame 50, the rear frame 58 and the front frame 57. The rear frame 58 is attached to the outer peripheral side of the fixed frame 50 on the imaging-surface side. The front frame 57 is attached to the outer peripheral side of the fixed frame 50 on the object side. The focus ring 89 is disposed between the rear frame 58 and the front frame 57.

With the structure, the adjusting mechanism 54 can be externally covered with the focus ring 89, and simultaneously, the focus ring 89 can be stably rotated.

Also, the interchangeable lens unit 2 of the present exemplary embodiment further includes the fixed frame and the rear frame 58 attached to the outer peripheral side of the fixed frame 50 on the imaging-surface side. The screws 54f press the primary focus shaft holding portion 54a and the arm portion 54b on the object side from the rear frame 58 in the optical axis direction.

With the structure, the position of the primary focus shaft 55 can be adjusted by the adjusting mechanism 54 in the assembled condition of the interchangeable lens unit 2 (excluding the front frame 57 and the focus ring 89).

Other Embodiment

The present invention is not limited to the aforementioned exemplary embodiment, and a variety of modifications and variations can be herein made without departing from the scope of the present invention. Further, the aforementioned exemplary embodiment is essentially provided as an exemplary preferred embodiment, and is not intended to limit the present invention, objects employing the present invention, or the range of application of the present invention.

(1) The aforementioned exemplary embodiment has been explained with an exemplary case that the digital camera 1 can shoot images and movies. However, the digital camera 1 may be either of a type only available for image shooting and a type only available for movie shooting.

(2) The aforementioned digital camera 1 is not provided with a quick-return mirror. However, the digital camera 1 may be provided with a quick-return mirror similarly to the conventional single-lens reflex cameras. Further, the digital camera 1 may be of a type that the lens barrel and the camera body are integrated.

(3) The structure of the optical system L is not limited to that of the aforementioned exemplary embodiment. For example, the third and fourth lenses L3 and L4 may not be joined to each other. Further, the optical system L may be a zoom lens with an adjustable focal distance. Not only the third, fourth and fifth lenses L3, L4 and L5 but also the entirety of the optical system L may be the focus lens.

(4) In the aforementioned exemplary embodiment, the urging spring 98 is either a single tension coil spring or a single compression coil spring. The urging spring 98 is disposed for setting the axis thereof to be in parallel too the optical axis AZ. Alternatively, a plurality of urging springs may be disposed for setting the axes thereof to be tilted with respect to the optical axis AZ. Further, the urging spring 98 is not necessarily limited to the coil spring. Yet further, arrangement of the abutted portion 52d and the nut 61 in the optical axis direction may be reversed, and the urging spring 98 may backwardly urge the focus movable unit 94.

(5) The aforementioned exemplary embodiment has been explained with an exemplary case that the digital camera 1 is configured to be operated based on the contrast autofocus. However, the digital camera 1 may be operated based on phase difference autofocus.

(6) The aforementioned exemplary embodiment has been explained with an exemplary case that a single arm portion 54b is provided. However, a plurality of arm portions 54b may be provided. Further, the aforementioned exemplary embodiment has been explained with an exemplary case that the arm portion 54b is integrally formed with the main body 154 and the primary focus shaft holding portion 54a. However, the arm portion 54b may be formed as an individual component separated from the main body 154 and the primary focus shaft holding portion 54a.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present invention should be interpreted relative to the lens barrel.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

Industrial Applicability

The art herein disclosed is useful as a lens barrel for devices such as an image device.

What is claimed is:

1. A lens barrel including an image optical system having an optical axis, the lens barrel comprising:
   a first lens configured to collect light from an object;
   a second lens disposed in the axial direction of the first lens and configured to move along the optical axis;
   a guide shaft disposed in the radial direction relative to the optical axis, the guide shaft being configured to guide the second lens along the optical axis;
   a driving unit configured to move the second lens along the guide shaft;
   an adjusting mechanism disposed in the radial direction relative to the optical axis, the adjusting mechanism being coupled to the guide shaft and including a first portion and a second portion, the first portion being elastically deflectable and supports one end of the guide shaft, the second portion being configured to press against the first portion to deflect the first portion at an angle relative to the optical axis, the adjusting mechanism being configured to tilt the guide shaft in a direction skew to the optical axis and set the position of the guide shaft if the second portion presses against the first portion; and
   a base frame that supports the other end of the guide shaft, the guide shaft being arranged to at least partially overlap the driving unit in the circumferential direction around the optical axis,
   the first lens being arranged to at least partially overlap the adjusting mechanism in the radial direction relative to the optical axis, and
   the second portion having a pressure axis coinciding with the direction of pressure being applied by the second portion to the first portion, the pressure axis being positioned away from the driving unit.

2. The lens barrel according to claim 1, wherein
the angle of deflection of the first portion includes deflecting the first portion in a first direction relative to the optical axis and deflecting the first portion in a second direction relative to both the first direction and the optical axis, and
the second portion includes a first pressure member and a second pressure member, the first pressure member is configured to press against the first portion in the first direction, and the second pressure member is configured to press against the first portion in the second direction.

3. The lens barrel according to claim 1, further comprising:
a third lens disposed on an imaging-surface side of the image optical system,
wherein the third lens is supported by the base frame.

4. The lens barrel according to claim 1, further comprising:
a first lens holding frame that holds the first lens;
a second lens holding frame that holds the second lens; and
a fixed frame that holds the first lens holding frame and the base frame.

5. The lens barrel according to claim 4, wherein
the fixed frame includes a substantially cylindrical wall portion and a notch, the wall portion is circumferentially disposed around the optical axis, and the notch is formed in the wall portion and intersects the pressure axis.

6. The lens barrel according to claim 5, further comprising:
a cylindrical member disposed on an outer peripheral side of the notch, wherein
the cylindrical member is rotatably attached to the fixed frame on an object side of the lens barrel.

7. The lens barrel according to claim 1, wherein
the adjusting mechanism further includes a main body, and
the first portion includes a holding portion and a coupling portion, the holding portion has an axis and holds one end of the guide shaft, and the coupling portion is coupled to the main body and the holding portion, the first portion is formed so that the axis of the holding portion is positioned closer to the main body than to an axis of the guide shaft.

8. The lens barrel according to claim 6, further comprising:
a fixed frame;
a first frame member attached to an outer peripheral side of the fixed frame on an imaging-surface side of the lens barrel; and
a second frame member attached to an outer peripheral side of the fixed frame on the object side of the lens barrel, wherein
the cylindrical member is disposed between the first frame member and the second frame member.

9. The lens barrel according to claim 1, further comprising:
a fixed frame; and
a first frame member attached to an outer peripheral side of the fixed frame on an imaging-surface side of the lens barrel, wherein
the second portion is configured to press against the first portion in an area in front of the first frame member.

* * * * *